United States Patent [19]

Kurakake

[11] 4,413,315
[45] Nov. 1, 1983

[54] ADDRESSING SYSTEM

[75] Inventor: Mitsuo Kurakake, Kokubunji, Japan

[73] Assignee: Fujitsu Fanuc Limited, Tokyo, Japan

[21] Appl. No.: 117,992

[22] Filed: Feb. 4, 1980

[30] Foreign Application Priority Data

Feb. 5, 1979 [JP] Japan .................. 54-12067

[51] Int. Cl.³ .............................................. G06F 9/36
[52] U.S. Cl. .................................................. 364/200
[58] Field of Search ... 364/200 MS File, 900 MS File

[56] References Cited

U.S. PATENT DOCUMENTS

| 3,323,109 | 5/1967 | Hecht et al. | 364/200 |
| 3,449,722 | 6/1969 | Tucker | 364/200 |
| 3,555,513 | 1/1971 | Hauck et al. | 364/200 |
| 4,034,347 | 7/1977 | Probert, Jr. | 364/200 |
| 4,037,210 | 7/1977 | Sharp | 364/200 |
| 4,047,247 | 9/1977 | Stanley | 364/200 |
| 4,121,286 | 10/1978 | Venton et al. | 364/200 |
| 4,128,881 | 12/1978 | Yamamoto et al. | 364/200 |
| 4,164,787 | 8/1979 | Aranguren | 364/200 |

Primary Examiner—Thomas M. Heckler
Attorney, Agent, or Firm—Staas & Halsey

[57] ABSTRACT

An addressing system for use with a computer system having a plurality of processing units connected to independent address buses and a plurality of memories connectable to any of the address buses and given a series of addresses. Each processing unit is connected to an address modification register and an adder connected to its address bus. The address content outputted from the processing unit and the content of the address modification register are added together by the adder. The added output is sent on the address bus to address a desired one of the memories. This system permits easy modification of memory allocation and enhances the operation speed of each processing unit.

8 Claims, 3 Drawing Figures

ADDRESSING SYSTEM

BACKGROUND OF THE INVENTION

1. Field of the Invention

This invention relates to an addressing system which is suitable for use in a computer system in which a plurality of processing units are capable of sharing a plurality of memories via independent address buses.

2. Description of the Prior Art

With considerable progress in large scale integrated circuit technology in recent years, high performance processing units are now available at relatively low costs. Thus, it is possible to carry into practice a system that employs a plurality of processing units in one piece of equipment to provide for enhanced performance in its entirety. In such a system, the effective utilization of memories and the universality of the system are desired; to meet the requirements, there has heretofore been proposed a computer system such, for example, as shown in FIG. 1.

In FIG. 1, a computer system, which is provided with a plurality of microprocessing units CPU1 to CPU3, is arranged so that memories MEM1 to MEM4 can be connected to a desired one of address buses BUS1 to BUS3 of the microprocessing units CPU1 to CPU3 through multiplexers MUX1 to MUX4, respectively. By switching the multiplexers MUX1 to MUX4, each microprocessing unit is permitted to use a desired one of the memories MEM1 to MEM4. Assuming that each of the memories MEM1 to MEM4 has, for example, 16K words capacity, the overall memory address space is such as shown in FIG. 2 which has a memory capacity of 64K words. In this case, setting the multiplexers, for example, MUX1 and MUX2 to connect the microprocessing unit CPU1 and the multiplexers MUX3 and MUX4 on the microprocessing units CPU2 and CPU3 respectively, the microprocessing unit CPU1 is able to use an address area 0000(H) to 7FFF(H), where H is the hexadecimal digit, of addresses assigned to the memories MEM1 to MEM4, whereas the microprocessing units CPU2 and CPU3 are able to use an address area 8000(H) to BFFF(H) and an address area C000(H) to FFFF(H), respectively. Since the setting of the multiplexers MUX1 to MUX4 can be freely altered in accordance with the memory capacity necessary for the microprocessing units CPU1 to CPU3, the universality of the system can be enhanced.

Incidentally, as will be appreciated from the memory map of FIG. 2, in the case of using the memories MEM1 to MEM4 separately by the microprocessing units CPU1 to CPU3, the leading addresses of the memories that are accessed by the microprocessing units except one (CPU1 in the illustrated example) do not naturally start with 0000(H), and the leading addresses also vary with modification of the memory allocation. Therefore, an address that is desired to be fixed for each microprocessing unit, such as, for example, a start address immediately after power source connection or a leading address of a stack for a subroutine, does not remain constant. Furthermore, it is impossible to adopt a direct addressing method which is effective for use in producing short word length instructions to reduce the execution time and the number of program steps used, for example, in an addressing method which is effective for an address in a limited range such as the data stored in the address area from the address 0000(H) to the address 00FF(H). Accordingly, each time the memory allocation to the microprocessing units CPU1 to CPU3 is modified, hardware and software must also be modified. This makes the modification of the memory allocation essentially difficult, and since the above-mentioned addressing method cannot be employed, the number of program steps inevitably increases.

SUMMARY OF THE INVENTION

It is an object of this invention to provide an addressing system, for use with computer systems, which ensures that the leading addresses of memories to be accessed by microprocessing units are always 0000(H).

Another object of this invention is to provide an addressing system, for use with computer systems, which permits easy modification of memory allocation and system modification.

Yet another object of this invention is to provide an addressing system, for use with computer systems, which reduces the number of program steps of each microprocessing unit to enhance its throughput.

In short, the present invention is directed to a computer system having a plurality of memories which are given a series of addresses. The memories are connectable to an address bus which is connected to any of a plurality of processing units. The memory capacity usable by each processing unit can be varied by changing the connections of the memories and the processing units and an address modification register and an adder are connected to each processing unit. The adder adds the content of an address from the processing unit and the content of the address modification register and provides the added output on the address bus. The content of the address modification register is rewritten in accordance with a modification of memory allocation; specifically, the content of the address modification register is set to an address number of the leading address of the memory assigned to the processing unit.

Other objects, features and advantages of this invention will become more apparent from the following description taken in conjunction with the accompanying drawings.

DESCRIPTION OF THE PREFERRED EMBODIMENT

Figure 1:
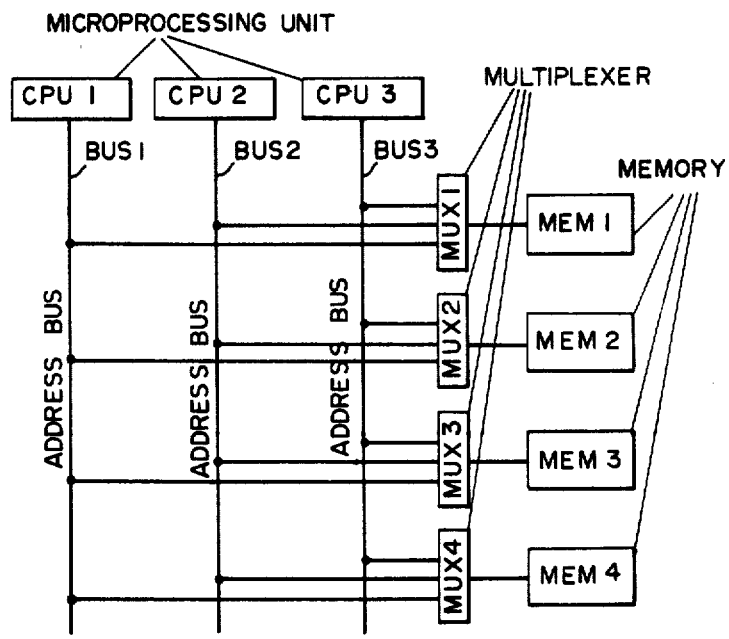
FIG. 1 is a block diagram showing a prior art computer system.
Figure 3:
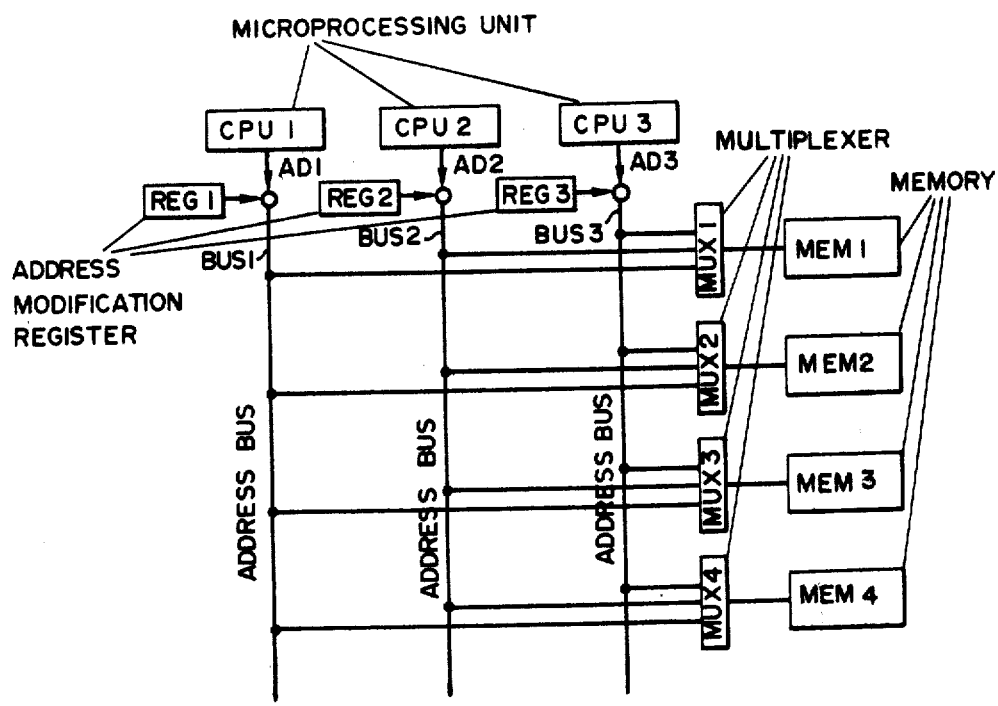
FIG. 3 is a block diagram illustrating the principal part of an example of a computer system embodying the present invention.

With reference to FIG. 3, an embodiment of this invention will hereinafter be described. In FIG. 3, parts corresponding to those in FIG. 1 are identified by the same reference characters. REG1 to REG3 indicate address modification registers, and AD1 to AD3 designate adders. In the present embodiment, the microprocessing units CPU1 to CPU3 are respectively connected to the address modification registers REG1 to REG3 and adders AD1 to AD3. The adders AD1 to AD3 respectively add the address outputs from the microprocessing units CPU1 to CPU3 and the contents of the address modification registers REG1 to REG3 and provide the added outputs to the address buses BUS1 to BUS3.

Figure 2:
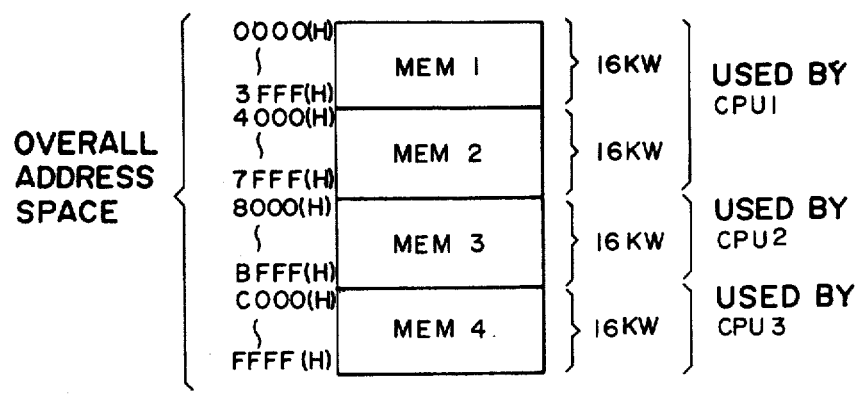
FIG. 2 is a diagram showing a memory address space.

In the case of allocating the memory area from the address 0000(H) to 7FFF(H) to the microprocessing unit CPU1 and the address area from the address 8000(H) to BFFF(H) and C000(H) to FFFF(H) to the microprocessing units CPU2 and CPU3, respectively, as is the case with the prior art described previously with respect to FIG. 2, the contents of the address modification registers REG1 to REG3 are set to 0000(H), 8000H and C000(H), respectively. With this setting, the leading address of the memory to be accessed by each microprocessing unit can always be regarded as 0000(H) from the microprocessing unit. When the abovesaid memory allocation is altered by switching the multiplexers MUX1 to MUX4, the contents of the address modification registers REG1 to REG3 are each changed to the address number of the leading address of the memory newly assigned to the corresponding microprocessing unit; as a consequence, the leading address of the memory can be regarded as 0000(H) from the microprocessing unit. This enables fixing of an address such as, for example, the start address immediately following power source connection or the leading address of a stack for a subroutine. This also permits easy modification of the memory allocation or the system used, without involving hardware and software modifications. Furthermore, since the leading address of the memory to be accessed by each microprocessing unit always starts with 0000(H), for example, direct addressing can be adopted, thereby reducing the number of program steps and hence enabling a high-speed processing operation.

In the description above, the number of microprocessing units used is described to be three, but this is for convenience of explanation, and two or more microprocessing units can be employed as desired. Furthermore, the number of memories is also not limited specifically to four.

As has been described in the foregoing, according to the present invention, in a computer system having a plurality of processing units each having independent address buses and a plurality of memories connectable to any of the address buses and given a series of addresses, an address modification register and an adder are connected to each processing unit. The adder adds together the address output from the processing unit and the content of the address modification register and provides the added output on the address bus. By proper setting of the content of the address modification register, the leading address of the memory to be accessed by the processing unit is held at 0000(H) at all times, so that the memory allocation can be modified without involving hardware and software modifications, thereby permitting easy system modification. Furthermore, since direct addressing can be adopted, the number of program steps is reduced and the processing speed is increased.

It will be apparent that many modifications and variations may be effected without departing from the scope of the novel concepts of this invention.

What is claimed is:

1. An addressing system for a computer system having a plurality of processing units operatively connected to corresponding address buses and a plurality of memories, connectable to any of the address buses, for receiving a series of addresses, comprising:

a plurality of address modification registers, one for each of said plurality of processing units; and a plurality of adders, each of which is operatively connected to a corresponding one of said plurality of address modification registers and operatively connected between one of said plurality of processing units and the corresponding one of said address buses, each of said plurality of processing units providing an address output within a range of address outputs beginning with a leading address, each of said plurality of processing units being capable of providing, as said address output, said leading address, each of said plurality of adders adding together the address output from the one of said plurality of processing units, to which it is operatively connected, and the content of the one of said plurality of address modification registers, to which it is operatively connected, and providing the added output to the one of said address buses corresponding to the one of said plurality of processing units.

2. An addressing system according to claim 1, wherein the content of the address modification register is set to the address number of the leading address of the one of said plurality of memories which is to be assigned to the processing unit to which the address modification register is operatively connected.

3. An addressing system according to claim 1, further comprising a plurality of multiplexers, each of said plurality of multiplexers operatively connected between one of said plurality of memories and one of said address buses.

4. An addressing system according to claim 1, wherein each of the plurality of processing units includes means for providing a direct addressing function.

5. An addressing system for a computer system having first and second microprocessing units, said first and second microprocessing units providing first and second address outputs, respectively, said addressing system comprising:

first and second modification registers for storing first and second modification addresses, respectively;

a first adder circuit, operatively connected to the first microprocessing unit and to said first address modification register, for adding the first address output from the first microprocessing unit and the first modification address and for providing a first added output;

a second adder circuit, operatively connected to the second microprocessing unit and to said second address modification register, for adding the second address output from the second microprocessing unit and the second modification address and for providing a second added output;

a first address bus operatively connected to said first adder circuit;

a second address bus operatively connected to said second adder circuit; and first, second and third memories, each of which is operatively connected to said first and second address buses, wherein the first and second added outputs are provided to the first and second address buses, respectively, said first and second address outputs being within a range of address outputs beginning with a leading address, each of said first and second microprocessing units being capable of providing, as said first and second address outputs, respectively, said leading address.

6. An addressing system as set forth in claim 5, further comprising:
- a first multiplexer operatively connected between said first memory and said first and second buses;
- a second multiplexer operatively connected between said second memory and said first and second buses; and
- a third multiplexer operatively connected between said third memory and said first and second buses, wherein said first, second and third multiplexers may be switched so that said first and second microprocessing units are permitted to use a desired one of the first, second and third memories.

7. An addressing system as set forth in claim 5 or 6, wherein at least one of said first, second and third memories is assigned to each of said first and second microprocessing units and wherein the content of each of said first and second address modification registers is set to the address number of the leading address of the assigned memory.

8. An addressing system as set forth in claim 7, wherein each of said first and second microprocessing units includes means for providing a direct addressing function.

* * * * *

UNITED STATES PATENT AND TRADEMARK OFFICE
CERTIFICATE OF CORRECTION

PATENT NO. : 4,413,315
DATED : NOVEMBER 1, 1983
INVENTOR(S) : MITSUO KURAKAKE

It is certified that error appears in the above-identified patent and that said Letters Patent is hereby corrected as shown below:

FRONT PAGE,

[56] References Cited, after "Stanley"
insert --et al.--.

Col. 1, line 14, "costs." should be --cost.--.

Signed and Sealed this

Second Day of October 1984

[SEAL]

Attest:

GERALD J. MOSSINGHOFF

*Attesting Officer*  *Commissioner of Patents and Trademarks*